United States Patent
Costa et al.

(10) Patent No.: US 10,066,054 B2
(45) Date of Patent: Sep. 4, 2018

(54) CONTINUOUS METHOD FOR MANUFACTURING A POLYESTER FROM CYCLIC ESTER MONOMER

(71) Applicant: Sulzer Chemtech AG, Winterthur (CH)

(72) Inventors: Liborio Ivano Costa, Winterthur (CH); Hans-Peter Brack, Herrliberg (CH); Francesca Tancini, Wettingen (CH); Yingchuan Yu, Zürich (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 15/510,859

(22) PCT Filed: Sep. 3, 2015

(86) PCT No.: PCT/EP2015/070163
§ 371 (c)(1),
(2) Date: Mar. 13, 2017

(87) PCT Pub. No.: WO2016/041782
PCT Pub. Date: Mar. 24, 2016

(65) Prior Publication Data
US 2017/0240697 A1    Aug. 24, 2017

(30) Foreign Application Priority Data

Sep. 17, 2014  (EP) .................................... 14185228
May 8, 2015    (EP) .................................... 15166929
Jun. 22, 2015  (EP) .................................... 15173141

(51) Int. Cl.
| C08G 63/02 | (2006.01) |
| C08G 63/78 | (2006.01) |
| C08G 63/08 | (2006.01) |
| C08G 63/90 | (2006.01) |

(52) U.S. Cl.
CPC ............. *C08G 63/78* (2013.01); *C08G 63/08* (2013.01); *C08G 63/90* (2013.01)

(58) Field of Classification Search
USPC .................................. 528/176, 190, 193, 194
See application file for complete search history.

(56) References Cited

U.S. PATENT DOCUMENTS

| 5,274,073 A | 12/1993 | Gruber et al. |
| 5,338,882 A | 8/1994 | Korte et al. |
| 5,686,540 A | 11/1997 | Kakizawa |
| 5,770,682 A | 6/1998 | Ohara et al. |
| 5,801,255 A | 9/1998 | Ohara et al. |
| 6,353,086 B1 | 3/2002 | Kolstad et al. |
| 7,942,955 B2 | 5/2011 | Streiff |
| 8,106,150 B2 | 1/2012 | Oka et al. |
| 8,153,754 B2 | 4/2012 | Kamikawa et al. |
| 2009/0111954 A1 | 4/2009 | Matsuo et al. |

FOREIGN PATENT DOCUMENTS

| CN | 101220138 B | 4/2010 |
| DE | 19631633 A1 | 2/1998 |
| EP | 2532711 A1 | 12/2012 |
| JP | 8-301993 A | 11/1996 |
| JP | 2004175838 A | 6/2004 |
| JP | 2008260893 A | 10/2008 |
| WO | 2010012770 A1 | 2/2010 |
| WO | 2012110117 A1 | 8/2012 |
| WO | 2013184014 A1 | 12/2013 |
| WO | 2014015999 A1 | 1/2014 |
| WO | 2014027037 A1 | 2/2014 |

OTHER PUBLICATIONS

Auras, R. et al, Poly(Lactic Acid): "Synthesis, Structures, Properties, Processing, and Applications", John Wiley & Sons, Inc., Published Online Sep. 15, 2010, pp. 11-14.

*Primary Examiner* — Terressa M Boykin
(74) *Attorney, Agent, or Firm* — Larson & Anderson, LLC (57) ABSTRACT

A process of manufacturing a polyester from cyclic ester monomer comprises the steps of: a) providing a cyclic ester, b) polymerizing the cyclic ester in the presence of a catalyst and optionally an initiator in a reactor to form a reaction mixture comprising polyester and unreacted cyclic ester, wherein after the polymerization at least one polymerization inhibitor is added to the reaction mixture, wherein the polymerization inhibitor is selected from the group consisting of monoimines, diimines, mono alkyl phosphates according to the formula $RPO_4H_2$, wherein R is a $C_{6-16}$ linear, branched or cyclic alkyl group, di alkyl phosphates according to the formula $R_2PO_4H$, wherein each R is independently a $C_{6-16}$ linear, branched or cyclic alkyl group or a combination thereof, and phosphate esters according to the general formula (I) wherein at least one of R', R" and R'" has the general structure as in general formula (II) wherein n>0 and Q is independently a $C_{1-16}$ linear, branched or substituted alkyl group, and R is independently an H or linear, branched, cyclic or substituted alkyl group or a phenyl group derivative, and wherein any of R', R" and R'" not having the general structure as in general formula (II) is independently an H or a linear, branched, cyclic or substituted alkyl group or a phenyl group derivative.

19 Claims, 4 Drawing Sheets

CONTINUOUS METHOD FOR MANUFACTURING A POLYESTER FROM CYCLIC ESTER MONOMER

The present invention relates to a continuous method for manufacturing a polyester from cyclic ester monomer. Moreover, the present invention relates to a polyester and to a condensed phase composition obtainable with such a method and to the use of such a condensed phase composition.

Cyclic esters are used as a starting material in processes for the polymerization of the cyclic diester of a hydroxyalkanoic acid to the respective polyhydroxyalkanoic acid. Specific examples for such cyclic esters and polymers resulting from a polymerization thereof are lactide—which is the cyclic diester of lactic acid—leading after polymerization to polylactic acid, glycolide—which is the cyclic diester of glycolic acid—leading after polymerization to polyglycolide, ε-caprolactone—which is the cyclic monoester of 6-hydroxyhexanoic acid—leading after polymerization to polycaprolactone. These polymers are of particular interest, because they are made from renewable resources and are biodegradable. Moreover, the technological properties of these polymers come quite close to those of polymers derived from fossil based resources, which is why these polymers are regarded as highly promising substitutes for the latter.

For example, polylactic acid has a wide range of applications in the biomedical field, namely e.g. in chirurgical implants, in films, such as e.g. in packaging, in fibers, such as e.g. for garments, hygienic articles, carpets and in disposable plastic products, such as e.g. disposable cutlery or containers. Moreover, polylactic acid has found wide application in composite materials, such as in fiber-reinforced plastics.

Generally, two alternative methods for synthesizing polylactic acid are known. The first method is the direct polycondensation of lactic acid to polylactic acid, which leads to low molecular weight polymer only. The second method is the ring-opening polymerization of lactide, which is the preferred method nowadays for the industrial production of polylactic acid. The starting material of the last mentioned method, namely lactide, is commonly produced by fermentation of carbohydrates from biomass, such as starch, sugar or corn resulting in lactic acid, by then oligomerizing the lactic acid and by afterwards subjecting the oligomers to a depolymerization reaction in order to obtain lactide. After purification, the lactide is then polymerized in the presence of a catalyst and optionally an initiator to form high molecular weight polylactic acid. The non-reacted lactide has to be removed after the polymerization to a final concentration of less than at least 0.5% by weight, in order to obtain a product of marketable quality. Such a removal of unreacted lactide can be achieved by means of at least one devolatilization step conducted at elevated temperature e.g. between 190 and 230° C. and at a reduced pressure of e.g. below 5 mbar. For example, a two-stage devolatilization process can be performed in order to obtain the required degree of lactide removal and thus to obtain a polymer having the required quality. In order to stop the polymerization reaction, an inhibitor is usually added to the polymeric product at the end of the polymerization and before or after the first devolatilization step. In order to maximize the yield of polymer product per amount of lactide feed, usually the unreacted lactide is recovered after the devolatilization e.g. by condensation, then optionally the condensed product is purified and thereafter the condensed product is recycled into the polymerization reaction. In particular, the addition of one or more efficient inhibitor additives at the end of the polymerization reaction is critical for an efficient devolatilization. If the inhibition of the catalyst is not efficient, lactide is reformed by depolymerization during the devolatilization process and as a result its content in the final polymer resin is higher than 0.5%. Additionally, inefficient deactivation of the catalyst causes polymer discoloration and possibly molecular weight loss during the high temperature devolatilization process. An efficient deactivation of the catalyst is also required in the condensed product in order to avoid an at least partial polymerization of the lactide in the presence of very low amounts of initiator and/or catalyst leading to an undesired increase in the viscosity of the composition or even to a solidification of the composition.

U.S. Pat. No. 5,770,682 discloses a method for preparing a polylactic acid comprising the steps of i) carrying out a ring-opening polymerization of lactide in the presence of a catalyst for ring-opening polymerization of the lactide to polylactic acid, ii) adding a compound capable of inactivating the catalyst to the resulting reaction mixture and iii) reducing the pressure in a reactor containing the reaction mixture and/or allowing an inert gas to pass through the reactor to remove unchanged lactide from the polylactic acid by devolatilization, wherein the compound capable of inactivating the catalyst is preferably selected from the group consisting phosphoric acid, phosphorous acid, derivatives thereof and aluminum compounds. Two subsequent devolatilization steps are performed and the vapor streams enriched in lactide are recycled to the polymerization reactor.

A similar method is known from WO 2014/027037 A1. In this method, a carboxylic acid anhydride is added as first polymerization inhibitor before the first devolatilization step and a phosphoric acid ester compound, preferably a mixture of mono- and di-stearic acid phosphates, is added as second polymerization inhibitor after the first devolatilization step.

Following the devolatilization step, the lactide vapor needs to be properly collected before reaching the vacuum pump. Due to the fact that in the second devolatilization vessel usually higher temperatures and lower pressures are applied compared to the conditions in the first devolatilization vessel, the outlet lactide vapor from the second devolatilization vessel cannot be efficiently condensed like that coming from the first devolatilization vessel. The reason therefore is that the vapor pressure of lactide at 100° C. is too close or even lower than the pressure applied during the second devolatilization step. Decreasing the temperature of the lactide liquid to minimize its vaporization is not an option, because the crystallization temperature of lactide is also quite close to 100° C., so that an excessive cooling of the material will cause its solidification. In order to address these problems, it was already suggested a respective method, such as shown in FIG. 2 of WO 2014/015999 A1, in which the lactide vapor coming from the first devolatilization step is contacted with steam in a steam injector and then further washed in a washing column. The core idea of this method is to react lactide with water, thus forming a lactic acid solution which can be cooled to less than 25° C. thus avoiding excessive evaporation of the liquid. More specifically, the vapor stream drawn off from a devolatilization device is conducted into a countercurrent column, which is preferably kept under vacuum, and contacted there with an aqueous solution, in order to dissolve and at least partially hydrolyze the lactide included in the vapour stream. The resulting mixture is then preferably led to a heat exchanger, where it is heated to a temperature of for instance 10 to 95° C., before it is led to a reactor, where it is kept with a residence time of at least 0.1 to 30 minutes at this temperature for allowing a complete or at least nearly complete dissolution and hydrolysis of the lactide in the aqueous solution. Then, the mixture is led to a further heat exchanger, where it is cooled to a temperature of for instance 5 to 25° C. Thereafter, the cooled mixture is recirculated as aqueous solution to the countercurrent column. A partial stream of the recirculated mixture is removed from any location of the recirculation system, such as before leading the mixture to the first heat exchanger, and then disposed.

However, during long-term performance of such a method making use of various inhibitors, two types of fouling problems have been experienced. Firstly, solid residues accumulate as insoluble floating material in the tank connected with the bottom of the washing column at a rate of about 2 to 4 kg/week. The formation of such insoluble floating solids is highly undesirable, since they accumulate in the column and cannot be easily drained, thus requiring a periodic discharge of the system. Additionally, this material deposits within the piping of the lactic acid solution recirculation line with the negative effect of worsening the efficiency of heat exchange in the heat exchangers. It was found by chemical analyses that the used polymerization inhibitor, namely a mixture of mono- and di-stearic acid phosphates, and decomposition products thereof, partially devolatilize during the devolatilization step and then accumulate in the overhead section of the plant and lead to the aforementioned fouling problems. Secondly, significant fouling may occur in the upstream first and/or second devolatilization chambers. Such fouling leads to the formation of a dark-colored insoluble solid coating on the surface of said chambers.

The object underlying the present invention is to provide a process for manufacturing a polyester from cyclic ester monomer, in which after termination of the polymerization an efficient polymerization inhibitor is used in order to completely and to reliably avoid a reformation of cyclic ester monomer by depolymerization during the devolatilization process and thus leading to a polymer with excellent quality, such as in particular visual appearance, and in which a fouling or deposition, respectively, of polymerization inhibitor and its decomposition products in the plant and especially in the devolatilization section of the plant is completely and reliably avoided.

In accordance with the present invention, this object is satisfied by providing a process of manufacturing a polyester from cyclic ester monomer, wherein the method comprises the steps of:
a) providing a cyclic ester,
b) polymerizing the cyclic ester in the presence of a catalyst and optionally an initiator in a reactor to form a reaction mixture comprising polyester and unreacted cyclic ester, wherein after the polymerization at least one polymerization inhibitor is added to the reaction mixture, wherein the polymerization inhibitor is selected from the group consisting of monoimines, diimines, mono alkyl phosphates according to the formula $RPO_4H_2$, wherein R is a $C_{6-16}$ linear, branched or cyclic alkyl group, di alkyl phosphates according to the formula $R_2PO_4H$, wherein each R is independently a $C_{6-16}$ linear, branched or cyclic alkyl group or a combination thereof, and phosphate esters according to the general formula (I)

wherein at least one of R', R" and R'" has the general structure as in general formula (II)

wherein n>0 and Q is independently a $C_{1-16}$ linear, branched or substituted alkyl group, and R is independently an H or linear, branched, cyclic or substituted alkyl group or a phenyl group derivative, and wherein any of R', R" and R'" not having the general structure as in general formula (II) is independently an H or a linear, branched, cyclic or substituted alkyl group or a phenyl group derivative.

This solution bases on the surprising finding that the aforementioned polymerization inhibitors are not only efficient inhibitors of the polymerization of cyclic esters and thus completely and reliably avoid a reformation of cyclic ester monomer by depolymerization during the devolatilization stages, but that these compounds also do not cause any fouling or deposition, respectively of polymerization inhibitor and its decomposition products in the plant and especially in the devolatilization section of the plant. Without wishing to be bound by any theory, it is considered that the reason for the fact that these compounds do not cause any fouling is that they are soluble in aqueous lactic acid solutions so that they dissolve in the liquid solution and not deposit as unsoluble fractions, when transferred into the overhead section of the devolatilization vessels. In addition, these compounds do have—on account of having a sufficiently high molecular weight—a low volatility, why they do not contaminate the devolatilization vessels. For example, in the aforementioned phosphate compounds, the presence of the oxygen in the side chains increases the solubility of the compounds in polar solutions, such as in water rich solutions, whereas the presence of the phosphate group effects that the compounds are efficient in inhibiting the reaction catalyst thus stabilizing the polymer. On account of these reasons, by making use of an aforementioned polymerization inhibitor in a process of manufacturing a polyester from cyclic ester monomer, not only a fouling or deposition, respectively, of polymerization inhibitor and its decomposition products in the plant and especially in the devolatilization section of the plant is completely and reliably avoided, but also an efficient polymerization inhibition is achieved after the termination of the polymerization reaction so that a reformation of cyclic ester monomer by depolymerization during the devolatilization process is completely and reliably avoided. Furthermore, the respective polymerization inhibitors are comparable cost efficient. Moreover, unexpectedly the use of the aforementioned polymerization inhibitors leads to polymer having an excellent visual appearance. In particular, the polymers obtained with the process in accordance with the present invention has an excellent transparency, wherein haze is reliably minimized in the polymers. In addition, it was found that the aforementioned polymerization inhibitors enable the production of polymers having a higher viscosity higher viscosity compared to those obtained with other inhibitors, such as mono and distearyl acid phosphates as used in the prior art methods. A further particular advantage of these polymerization inhibitors is that they can be used in all known conventional methods.

This solution is all the more surprising, because other similar compounds do not allow to avoid such a fouling. For example, respective experiments have shown that low molecular weight phosphate compounds, such as dibutyl phosphate, which is liquid at room temperature with a normal boiling point of 275° C. cause severe fouling problems directly in the devolatilization tanks. It was considered that such volatile phosphate-based polymerization inhibitors and/or their degradation products when transferred together with the gas stream at the outlet of a devolatilization vessel to the wash section, would be easily devolatilized there and would thus not cause any fouling in the wash section and the downstream recirculation system. Alternatively, the fraction of inhibitor and/or degradation products which might be transferred to the wash section and not be readily devolatilized there, would be there in a liquid state, thus again without causing any fouling in the wash section parts. However upon testing, it was found in the present invention that although no fouling occurred in the portion of the wash section with such highly volatile polymerization inhibitors, surprisingly significant fouling occurred in the upstream first and/or second devolatilization chambers. Such fouling leads to the formation of a dark-colored insoluble solid coating on the surface of said chambers. As a function of the production run time the color of the resulting polyester polymer product is then also found to deteriorate as fouling proceeded. Again without wishing to be bound by any particular mechanism, it is considered that this fouling is caused by the ready vapor-phase thermal degradation of such highly volatile phosphate-based polymerization inhibitors within the chamber to give a solid residue on the chamber surfaces.

In accordance with a first particular preferred embodiment of the present invention, a phosphate ester according to the general formula (I) is used as polymerization inhibitor. These phosphate esters surprisingly reliably avoid the two aforementioned different fouling problematics in the plant and especially in the devolatilization section of the plant.

Preferably, the molecular weight of the phosphate ester according to the general formula (I) is above 250 g/mol. Such compounds are particular efficient polymerization inhibitors and particularly able to reliably avoid the two aforementioned different fouling problematics in the plant and especially in the devolatilization section of the plant.

It is preferred in this embodiment that one or two of the residues R', R" and R'" are as shown in general formula (II), whereas the remaining of the residues R', R" and R'" are a hydrogen. Accordingly, it is preferred that either i) R' is an H and R" and R'" are according to the general formula (II) or ii) R' and R" are an H and R'" is according to the general formula (II).

Alternatively, one or two of the residues R', R" and R'" may be as shown in general formula (II), whereas the remaining of the residues R', R" and R'" are independently a $C_{6-16}$ linear, branched, cyclic or substituted alkyl group or a phenyl group derivative.

In accordance with still another alternative, all residues R', R" and R'" may have independently from each other a structure as in general formula (II).

In a further development of the idea of the present patent application it is suggested to use in the process in accordance with the present invention as polymerization inhibitor a phosphate ester according to the general formula (I), in which n of the at least one of R', R" and R'" having the general structure as in general formula (II) is 2 to 20, and in which Q of the at least one of R', R" and R'" having the general structure as in general formula (II) is a $C_{1-15}$ linear, branched or substituted alkyl group. Particular good results are obtained in this embodiment, when the polymerization inhibitor is a phosphate ester according to the general formula (I), in which n of the at least one of R', R" and R'" having the general structure as in general formula (II) is 2 to 11, and in which Q of the at least one of R', R" and R'" having the general structure as in general formula (II) is a $C_{1-6}$ linear alkyl group and more preferably a 1,2-ethanediyl group.

Preferably, any compound selected from the group consisting of [poly(oxy-1,2-ethanediyl) mono-alkyl-ether phosphates], [poly(oxy-1,2-ethanediol)-phenyl-hydroxy phosphates], [poly(oxy-1,2-ethanediyl) omega-hydroxy phosphates] and arbitrary combinations of two or more of these substances may be used as the polymerization inhibitor in the method in accordance with the present invention.

Particular good results are obtained, when a compound according to the general formulae (III) or (IV) are used as polymerization inhibitor:

wherein in both formulae R is H or a linear, branched, cyclic or substituted alkyl group or a phenyl group derivative. Preferably, R is H or a $C_{1-16}$-alkyl group.

In accordance with a particular preferred embodiment of the present invention, as the polymerization inhibitor a poly(oxy-1,2-ethanediyl), alpha-isotridecyl-omega-hydroxy-phosphate (CAS 9046-01-9) and/or a poly(oxy-1,2-ethanediyl), alpha-hydro-omega-hydroxy-mono-$C_{12-15}$-alkyl ether phosphate (CAS 68071-35-2) is used.

According to a second particular preferred embodiment of the present invention, a diimine compound is used as polymerization inhibitor.

Preferably, the molecular weight of the diimine compound is above 250 g/mol. Such compounds are particular efficient polymerization inhibitors and particularly able to reliably avoid the two aforementioned different fouling problematics in the plant and especially in the devolatilization section of the plant.

For example, the diimine compound may have the general formula (V)

wherein R is an optionally substituted alkyl group, a cycloalkyl group or an aryl group, such as a phenyl group, and all of R', R", R'", R$^{IV}$ are independently H or an optionally substituted alkyl group, a cycloalkyl group or an aryl group, such as a phenyl group.

Preferably, in general formula (V) residues R' and R'" are hydrogen and residues R" and R$^{IV}$ are an alkyl group, a cycloalkyl group or an aryl group, such as a phenyl group.

Particular good results are obtained, when in general formula (V) R is a $C_{1-5}$-alkanediyl group, residues R' and R'" are hydrogen and residues R" and R$^{IV}$ are an aryl group, such as a phenyl group.

More preferably, in general formula (V) R is a $C_{2-4}$-alkanediyl group, residues R' and R''' are hydrogen and residues R'' and R$^{IV}$ are a $C_6$-aryl group or a substituted $C_6$-aryl group, such as a phenyl group.

Most preferably, in this embodiment N,N'-bis(salicylidene)-1,3-propanediamine (CAS 120-70-7) having a weight average molecular weight of 282 g/mol is used as polymerization inhibitor, i.e. a compound according to the general formula (V), in which R is a propanediyl group, residues R' and R''' are hydrogen and residues R'' and R$^{IV}$ are a hydroxy phenyl group

According to a third particular preferred embodiment of the present invention, a mono alkyl phosphates according to the formula $RPO_4H_2$ is used as polymerization inhibitor, wherein R is preferably a $C_{6-16}$ linear alkyl group and more preferably a $C_{8-13}$ linear alkyl group compound.

According to a fourth particular preferred embodiment of the present invention, a di alkyl phosphates according to the formula $R_2PO_4H$ is used as polymerization inhibitor, wherein both R are preferably independently a $C_{6-16}$ linear alkyl group and more preferably a $C_{8-13}$ linear alkyl group compound.

According to a fifth particular preferred embodiment of the present invention, a monoimine compound is used as polymerization inhibitor.

Preferably, the molecular weight of the mono alkyl phosphates according to the third particular preferred embodiment of the present invention, the molecular weight of the di alkyl phosphates according to the fourth particular preferred embodiment of the present invention and the molecular weight of the monoimine compound according to the fifth particular preferred embodiment of the present invention is above 250 g/mol. Such compounds are particular efficient polymerization inhibitors and particularly able to reliably avoid the two aforementioned different fouling problematics in the plant and especially in the devolatilization section of the plant.

For example, the monoimine compound may have the general formula (VI)

(IV)

wherein each of R, R' and R'' is H, an alkyl group, a cycloalkyl group or an aryl group. Preferably, R'' is H and any of R and R' is a $C_{1-6}$-alkyl group or an aryl group.

Independently, which of the aforementioned compounds is used as polymerization inhibitor, it is added in such an amount that its concentration in the composition is 0,0001 to 1% by weight, preferably 0.001 to 0.5% by weight, more preferably 0.01 to 0.2% by weight and even more preferably 0.02 to 0.15% by weight.

With regard to the chemical nature of the cyclic ester, the present invention is not particularly limited. In particular, any cyclic monoester, any cyclic diester, any cyclic triester or the like may be used. A particularly suitable cyclic monoester is ε-caprolactone, whereas preferred examples for cyclic diesters are lactide, L-lactide, D-lactide, meso-lactide, glycolide and mixtures thereof. Thus, the at least one cyclic ester is preferably selected from the group consisting of lactide, L-lactide, D-lactide, meso-lactide, ε-caprolactone, glycolide or mixtures of one or more of the aforementioned substances.

There is no particular limitation of the present patent application concerning the chemical nature of the catalyst. Preferably, as catalyst at least one organometallic compound comprising a metal selected from the group consisting of magnesium, titanium, zinc, aluminum, indium, yttrium, tin, lead, antimony, bismuth and any combination of two or more of the aforementioned metals is used, wherein the at least one organometallic compound preferably comprises as organic residue a residue selected from the group consisting of alkyl groups, aryl groups, halides, oxides, alkanoates, alkoxides and any combination of two or more of the aforementioned groups.

In particular for the case that the cyclic ester of the condensed phase composition is lactide, halides, oxides, alkanoates, alkoxides of the aforementioned metals as well as alkyl- or aryl-group bearing compounds of these metals are particularly preferred catalysts. Even more preferred polymerization catalysts is in this case tin octoate, i.e. tin(II)-2-ethylhexanoate.

Usually, the concentration of the catalyst in the composition is 0.0001 to 1% by weight and preferably 0.001 to 0.05% by weight, whereas in the case of organometallic compounds the amount of metal in the composition is preferably 0.1 to 200 ppm and more preferably 1 to 50 ppm.

Preferably, in addition to a polymerization catalyst a polymerization initiator or polymerization co-catalyst, respectively, is added for the polymerization. Usually, as initiator at least one compound comprising at least one carboxyl group and/or hydroxyl group is used, which are very effective to initiate the oligomerization of cyclic esters. Preferably, as polymerization initiator at least one compound selected from the group consisting of water, alcohols, lactic acid, oligomers of the cyclic ester, polymers of the cyclic ester and any combination of two or more of the aforementioned substances is added. Moreover it is preferred that the oligomer and/or polymer of the cyclic ester is an oligomer and/or polymer of lactic acid or glycolide.

While a catalyst is defined within the scope of the present invention in line with the usual definition of this term in the relevant field as a substance increasing the rate of a chemical reaction without being consumed by the reaction, a polymerization initiator or polymerization co-catalyst or promoter, respectively, is defined—also in line with the usual definition of this term in the relevant field—as a substance that improves the catalytic activity.

Usually, the composition contains an amount of initiator corresponding to 0.1 to 100 mmol and more preferably 1 to 40 mmol per kg of the composition.

In accordance with a further preferred embodiment of the present invention, the process further comprises the following steps:

c) subjecting the reaction mixture to a devolatilization to obtain a purified polyester as molten residue and vapor, wherein the vapor includes mainly i) cyclic ester and ii) catalyst and/or initiator and/or a reaction product or a residue of catalyst and/or of initiator, and d) subjecting the vapor stream to a condensation to obtain a condensed phase composition, wherein at least a part of the polymerization inhibitor is added to the vapor stream drawn off from the devolatilization and/or to the condensed composition, and/or wherein at least a part of the polymerization inhibitor is added to the reaction mixture before step c).

The devolatilization of the reaction mixture to produce the vapor stream may be performed in any known devolatilization reactor at elevated temperature and under reduced pressure. Preferably, the devolatilization is performed at a temperature between 170° C. and 250° C. and at a pressure between 0.1 and 50 mbar, more preferably at a temperature between 180° C. and 240° C. and at a pressure between 0.5 and 25 mbar and most preferably at a temperature between 190° C. and 230° C. and at a pressure between 1 and 10 mbar. While the devolatilization can be done under vacuum, alternatively an inert gas, such as nitrogen, argon or carbon dioxide, may be purged through the devolatilization device. The aforementioned devolatilization conditions are in particular useful for devolatilizing a reaction mixture including lactide as cyclic ester, but are also useful for example for devolatilizing a composition including glycolide or ε-caprolactone as cyclic ester.

Also, the condensation can be performed in any condensation device, in which the vapor stream drawn off from the devolatilization device is condensed into the liquid phase by cooling it down to a temperature between above of its melting point and below its boiling point at the pressure at which the condensed phase composition is condensed.

In accordance with a particularly preferred alternative of the aforementioned embodiment, at least a part of the polymerization inhibitor is added to the vapor stream drawn off from the devolatilization and/or to the condensed composition. Thereby, the polymerization inhibitor is directly added to the vapor stream drawn off from the devolatilization and/or to the condensed composition, respectively. Due to the addition of the polymerization inhibitor after the devolatilization, i.e. into the vapor stream drawn off from the devolatilization or to the condensed composition, a comparable low amount of polymerization inhibitor has to be added, namely exactly that amount, in order to stabilize the condensed phase composition, which is necessary, in order to avoid an oligomerization and/or polymerization of the cyclic ester included in the condensed phase composition, even after a long term storage in molten form at an elevated temperature.

In order to be able to work with the minimum amount of polymerization inhibitor to sufficiently stabilize the condensed phase composition, it is suggested in a further development of the present invention to mix the condensed phase composition during and preferably also after the addition of the polymerization inhibitor into the condensed phase composition. In this manner, a homogenous distribution of the polymerization inhibitor in the condensed phase composition is ensured so that only a minimum amount thereof has to be added to the condensed phase composition. In contrast thereto, should any inhomogeneity arise throughout the condensed phase composition, more than a minimum amount of the polymerization inhibitor would be necessary to ensure that also at those locations of the condensed phase composition having the lowest inhibitor concentration, enough inhibitor is present to reliably suppress an oligomerization or polymerization of the condensed phase composition.

The mixing may be performed already in the vapor phase or in the final condensed phase composition, by any known mixer, which is able to ensure a homogenization mixing. In particular, any suitable static mixer and/or any suitable dynamic mixer may be used. Particular good results are achieved if a mixer selected from the group consisting of SMI, SMV™, KVM, SMX™, SMX™ plus or SMXL™ Sulzer static mixers, from dynamic mixers equipped with impellers or helical ribbons, from anchor mixers as well as from any combination of two or more of the aforementioned mixers is used.

The amount of the polymerization inhibitor included in the condensed phase composition is in the aforementioned embodiment the same as described above.

This embodiment is particular useful for manufacturing a polylactic acid, a polycaprolactone or a polyglycolide, i.e. for using a cyclic ester selected from the group consisting of lactide, L-lactide, D-lactide, meso-lactide, ε-caprolactone and glycolide.

As polymerization catalyst and polymerization initiator, the aforementioned substances may be used in the present embodiment in the amounts described above as preferred. Preferably, the reaction mixture of step b) includes 0.5 to 50% by weight and preferably 1 to less than 15% by weight of cyclic ester.

Moreover, the devolatilization and condensation conditions described above as preferred may be used in the present embodiment.

Preferably, the polymerization is performed in step b) of the method in accordance with the present embodiment until a polymer having an absolute weight average molecular weight (Mw) of at least 10,000 g/mol, preferably of at least 15,000 g/mol and more preferably of at least 20,000 g/mol is obtained. The Mw is measured in accordance with the present invention by gel permeation chromatography (GPC) using an absolute calibration. The measurement is preferably performed on a Viscotek TADmax (Malvern) equipped with triple detection (Refractive Index, Viscosimeter and Right/Low Angle Light Scattering) using the solvent enhanced light scattering method, chloroform as polymer solvent, acetone as eluent and calibration of the equipment parameters carried out with PMMA standards.

Moreover, it is preferred that the polymerization is performed in step b) at a temperature of between 120° C. and 250° C., more preferably at a temperature of between 150° C. and 200° C. and most preferably at a temperature of between 160° C. and 190° C.

Optionally, a polymerization inhibitor may be included in the aforementioned embodiment—in addition to the polymerization inhibitor, which is added to the vapor stream drawn off from the devolatilization and/or to the condensed composition—before the step c), i.e. before subjecting the reaction mixture to the devolatilization to obtain a purified polyester as the molten residue and the vapor.

In accordance with an even more preferred alternative of the aforementioned embodiment at least a part of the polymerization inhibitor is added to the reaction mixture before step c), in order to completely and reliably avoid a reformation of cyclic ester monomer by depolymerization during the devolatilization stages and in order to also completely and reliably avoid a fouling of polymerization inhibitor and its decomposition products in the plant and especially in the devolatilization section of the plant.

The devolatilization is performed in this embodiment at the same numeric value ranges for the temperature and pressure as set out above. However, it is preferred to perform the devolatilization in this embodiment at a temperature, which is at the upper end of the numeric value range specified therefor above, and perform the devolatilization in this embodiment at a pressure, which is at the lower end of the numeric value range specified therefor above. The aforementioned devolatilization conditions are in particular useful for devolatilizing a composition including lactide as cyclic ester, but are also useful for example for devolatilizing a composition including glycolide, ε-caprolactone or mixtures thereof as cyclic ester.

The amount of the polymerization inhibitor included into the reaction mixture before step c) is so that the content of the polymerization inhibitor in the later condensed phase composition is in the aforementioned embodiment preferably 0.001 to 0.5% by weight based on the total weight of the composition. More preferably, the amount of the polymerization inhibitor in the condensed phase composition is 0.01 to 0.2% by weight and most preferably about 0.02% to 0.15% by weight based on the total weight of the composition. In order to achieve such an appropriate polymerization inhibitor content, when performing the devolatilization at the above mentioned preferred conditions 0.001 to 0.5% by weight, more preferably 0.01 to 0.2% by weight and most preferably about 0.02 to 0.15% by weight based on the total weight of the composition polymerization inhibitor have to be added in this embodiment to the reaction mixture before step c).

More specifically, preferably the devolatilization in step c) is performed in this embodiment at a temperature between more than 200° C. and 300° C. and at a pressure between 0.1 and 12 mbar, and the amount of the polymerization inhibitor added into the reaction mixture before step c) is 0.01 to 0.20% by weight based on the total weight of the reaction mixture.

More preferably, the devolatilization in step c) is performed in this embodiment at a temperature between 210° C. and 280° C. and at a pressure between 0.5 and 10 mbar, and the amount of the polymerization inhibitor added into the reaction mixture before step c) is 0.01 to 0.20% by weight based on the total weight of the reaction mixture.

Even more preferably, the devolatilization in step c) is performed at a temperature between 225 to 250° C. and at a pressure between 1 and 5 mbar, and the amount of the polymerization inhibitor added into the reaction mixture before step c) is 0.01 to 0.2% by weight based on the total weight of the reaction mixture.

In order to be able to work with the minimum amount of polymerization inhibitor to stabilize the polymer as well as to sufficiently stabilize the condensed phase composition, it is suggested also for this embodiment to perform a mixing already in the vapor phase or in the final condensed phase composition, by any known mixing method as described above.

Also this embodiment is particular useful for manufacturing a polylactic acid, a polycaprolactone or a polyglycolide, i.e. for using a cyclic ester selected from the group consisting of lactide, L-lactide, D-lactide, meso-lactide, ε-caprolactone and glycolide and mixtures thereof.

As polymerization catalyst and polymerization initiator, the aforementioned substances may be used in the present embodiment in the amounts described above as preferred. Preferably, the reaction mixture of step b) includes 0.5 to 50% by weight and preferably 1 to less than 15% by weight of cyclic ester.

Moreover, the condensation conditions described above as preferred may be used in the present embodiment.

Preferably, the polymerization is performed in step b) of the method in accordance with the present embodiment until a polymer having a Mw of at least 10,000 g/mol, preferably of at least 15,000 g/mol and more preferably of at least 20,000 g/mol is obtained.

Moreover, it is preferred that the polymerization is performed in step b) at a temperature of between 120° C. and 250° C., more preferably at a temperature of between 150° C. and 200° C. and most preferably at a temperature of between 160° C. and 190° C.

Optionally, a polymerization inhibitor may be included in the aforementioned embodiment—in addition to the polymerization inhibitor, which is added to the reaction mixture before step c)—to the vapor stream drawn off from the devolatilization and/or to the condensed composition, in order to stabilize the condensed phase composition.

In further development of the idea of the present invention, an amount of the cyclic ester devolatilized to an overhead system comprising a gas removal line and/or vapor removal lines is decreased relative to the amount of the cyclic ester devolatilized when no polymerization inhibitor is added to the reaction mixture in the process in accordance with the present invention.

Moreover, it is preferred that the polyester has a yellowness index measured after pelletization in accordance with YI-D1925 that is reduced relative to a yellowness index after pelletization of a polyester in which no polymerization inhibitor has been added to the reaction mixture.

In accordance with a further particularly preferred embodiment of the present invention, the condensed phase composition comprising the polymerization inhibitor is subjected to a purification step, before it is subjected to its intended use. During the purification step, impurities included in the condensed phase composition, such as polymerization catalyst and/or polymerization initiator as well as polymerization inhibitor, are removed. The so purified condensed phase composition then consists at least essentially of the cyclic ester.

Preferably, the condensed phase composition comprising the polymerization inhibitor is subjected to a melt crystallization step, a distillation step or solvent crystallization step and preferably to a melt crystallization step, to obtain a purified condensed phase composition, before it is subjected to its intended use.

More preferably, the condensed phase composition comprising the polymerization inhibitor is subjected to a melt crystallization step, to obtain a purified condensed phase composition, before it is subjected to its intended use. Preferably, the condensed phase composition is crystallized in the melt crystallization step without any solvent, which has the advantage that further steps to remove any solvents are not required.

The melt crystallization is preferably performed by a static crystallization, a dynamic crystallization or a combination thereof. For this purpose, any suitable type of static crystallizers and/or of dynamic crystallizers known to a person skilled in the art may be used. A particular preferred example for a dynamic crystallizer is a falling film crystallizer.

Static crystallization can be performed by using tubes which are heated or cooled by an internal circulation of heat transfer medium or alternatively by using plates, which can be oriented either vertically, horizontally or at any preferred orientation, wherein the plates are suspended in the molten feed which needs to be purified by crystallization. In a first step, the substance to be purified is crystallized at the surface of the vertical plates, wherein the remaining melt including predominantly impurities is removed as a first residue. In a second step, the crystallized mass is partially melted or "sweated", respectively, to melt predominantly remaining impurities included in the crystals and the resulting melt is then removed as a second residue from the crystallizer. Then, in a third step the so purified crystals are molten and removed as product melt. Static crystallization has the advantage of high flexibility, of wide operating range, of easy operation since there is no crystal slurry handling and no filtration, of high reliability and of low operation costs. In particular, static crystallization is preferred over dynamic crystallization when thermally sensitive substances are purified.

A falling film crystallizer consists of a system of essentially vertical tubes. During the crystallization process, the composition to be purified and the heat transfer medium both flows as a falling film down on the surfaces of the tubes. However, while the composition to be purified flow as a falling film down on the inside surface of the tubes, the heat transfer medium used for cooling and heating is distributed to wet the outer surface of the tubes. During the crystallization, cold heat transfer medium is used to chill the tubes, so that the substance to be purified crystallizes on the inside surface of the tubes, wherein the remaining melt including predominantly impurities is removed from the crystallizer as a first residue. After the crystallization, a partial melting or "sweating", respectively, is induced by slightly raising the temperature of the heat transfer medium, in order to melt predominantly remaining impurities included in the crystals and the resulting melt is then removed as a second residue from the crystallizer. Then, the final melting of the crystals is performed by applying higher temperatures to provide the purified liquid, which is removed as product melt. Falling film crystallization leads to a high capacity and is characterized by an easy operation since there is no crystal slurry handling and no filtration, by a high reliability and by low operation costs.

Preferably, the crystallization is performed by cooling the condensed phase composition at a temperature which is 0.1 to 50° C. lower than the solidification point of the composition, and more preferably by cooling the condensed phase composition at a temperature which is 0.5 to 25° C. lower than the solidification point of the composition In accordance with an alternative embodiment to the aforementioned, no purification of the condensed phase composition is conducted before it is subjected to its intended use. In this embodiment, the condensed phase composition is used in the later application, such as polymerization to polyester, such as polylactic acid, in unpurified form, wherein respective higher amounts of catalyst and initiator are added to contemplate for the remaining polymerization inhibitor.

The intended use of the condensed phase composition may be in particular its recycling into a reactor, such as a polymerization reactor used for the production of polyester, such as polylactic acid, or to a prepolymerization reactor used for the production of polyester-prepolymer as precursor for a depolymerization to a cyclic diester, such as lactide.

The reactor, to which the condensed phase composition is recycled, may be in particular a loop reactor or a plug flow reactor.

In accordance with another aspect, the present invention relates to a method for stabilizing a condensed phase composition used in a process of manufacturing a polyester from cyclic ester monomer, wherein the method preferably comprises the steps of:
a) providing a cyclic ester,
b) polymerizing the cyclic ester in the presence of a catalyst and optionally an initiator in a reactor to form a reaction mixture comprising polyester and unreacted cyclic ester,
c) subjecting the reaction mixture to the devolatilization to obtain a purified polyester as the molten residue and the vapor, which includes mainly i) the at least one polymerizable cyclic ester and ii) the at least one catalyst and/or the at least one initiator and/or a reaction product or a residue of the at least one catalyst and/or the at least one initiator, and
d) subjecting the vapor stream to the condensation to obtain the condensed phase composition,
wherein at least one of the aforementioned polymerization inhibitor is added as stabilizer to the reaction mixture before step c), and, wherein the devolatilization is performed at a temperature of above 220° C. and/or at a pressure below 5 mbar.

Preferably, the devolatilization is performed at a temperature of between above 220° C. and 300° C. and/or at a pressure of between 1 and 5 mbar and more preferably at a temperature of between above 220° C. and 250° C. and/or at a pressure of between 1 and 3 mbar.

As cyclic ester, catalyst and initiator the compounds described above for the other embodiments may be used in the aforementioned amounts.

According to another aspect, the present invention relates to a plant for stabilizing a condensed phase composition used in a process of manufacturing a polyester from cyclic ester monomer, wherein the plant comprises:
a) at least one reactor for polymerizing cyclic ester in the presence of a catalyst and optionally an initiator to form a reaction mixture comprising polyester and unreacted cyclic ester,
b) at least one devolatilization device to separate a low boiling vapor phase comprising cyclic ester and the catalyst and/or the initiator and/or a reaction product or a residue of the at least one catalyst and/or the at least one initiator from a molten residue including mainly polymerized cyclic ester, and
c) at least one condenser device to condense the vapor stream to a condensed phase composition,
wherein the plant further comprises at least one feeding line for feeding a polymerization inhibitor either into the vapor stream drawn off from the devolatilization and/or to the condensed composition.

Preferably, the plant further comprises a mixer, which is located e.g. in the condenser or downstream of the condenser, which is adapted to homogeneously mix the polymerization inhibitor in the condensed phase composition. Preferably, the mixer is a mixer as described above. Alternatively, the mixer may be located so that the mixing is performed already in the vapor phase.

Moreover, it is preferred that the plant further comprises at least one purification device downstream of the condenser, which allows to remove impurities and in particular polymerization catalysts, polymerization initiators and polymerization inhibitors from a cyclic ester including condensed phase composition. Preferably, the purification device is a static crystallizer, a dynamic crystallizer or a combination thereof. For this purpose, any type of static crystallizers and/or of dynamic crystallizers known to a person skilled in the art may be used. A particular preferred example for a dynamic crystallizer is a falling film crystallizer.

Preferably, the at least one purification device is connected with the condenser via a line and further comprises a return line leading from the purification device back to the reactor system.

In accordance with a particular preferred embodiment of the present invention, the vapor stream drawn off from a devolatilization device is subjected to a wash step in a wash section of the plant. For instance, the vapor stream drawn off from a devolatilization device is conducted into a countercurrent column, which is preferably kept under vacuum, and contacted there with an aqueous solution, in order to dissolve and at least partially hydrolyze the lactide included in the vapour stream. The resulting mixture is then preferably led to a heat exchanger, where it is heated to a temperature of for instance 10 to 95° C. and preferably of 10 to 60° C., before it is led to a reactor, where it is kept with a residence time of at least 0.1 to 30 minutes and preferably of at least 0.1 to 10 minutes at this temperature for allowing a complete or at least nearly complete dissolution and hydrolysis of the lactide in the aqueous solution, before it is led to a further heat exchanger, where it is cooled to a temperature of for instance 5 to 25° C., preferably of 5 to 15° C. and more preferably of 7 to 12° C. Thereafter, the cooled mixture is recirculated as aqueous solution to the countercurrent column. A partial stream of the recirculated mixture is removed from any location of the recirculation system, such as before leading the mixture to the first heat exchanger, and then disposed.

A further aspect of the present invention is a polyester obtainable and preferably actually obtained with a process as described above. The polyester obtainable with a process as described above is different from those known in the prior art in that it contains the polymerization inhibitor of the invention and/or its residue and/or reaction product—i.e. complex with the catalyst. The polyester composition and preferably polylactic acid composition according to the present invention has surprising advantages over the known polyester in terms of high stability against lactide reformation and good visual appearance in terms of low yellow index and haze. Furthermore this composition may be prepared by the process of the invention and thus benefits from its surprising advantages during its production.

Conventional methods for analyzing additives in polymers may be used in may embodiments of the present invention, to confirm that a polylactic acid or other polyester contains the polymerization inhibitor of the invention and/or its residue and/or reaction product. These methods include spectroscopic methods, such as infrared, Raman and NMR spectroscopies, as well as solvent extraction methods combined with infrared spectroscopy, mass spectrometry or liquid chromatography. The analytical method is preferably solvent extraction combined with high performance liquid chromatography (HPLC).

As set out above, the polymer preferably contains the polymerization inhibitor of the invention and/or its residue and/or its reaction product, i.e. as a complex with the catalyst. The polymerization inhibitor of this embodiment is preferably of the phosphate ester type and the polymer contains phosphorus in an amount of less than 5,000 ppm, preferably of less than 4,000 ppm as measured by X-ray fluorescence (XRF) spectroscopy or inductively coupled plasma atomic emission spectroscopy (ICP-AES), preferably ICP-AES.

The polymer preferably has an number average molecular weight Mn absolute measured by GPC of 10,000 to 150,000, more preferably 15,000 to 80,000 Dalton. It is preferred in this embodiment that the polydispersity (Pd) is less than 2.5.

The polymer may contains lactide in an amount of less than 0.3, preferably 0.2% by weight.

The polymer may have a lactide reformation measured at 250° C./25 min of less than 0.5, preferably 0.3% by weight.

The polymer may have a yellowness index value measured by ASTM D1925 of less than 20, preferably less than 10.

The polymer of the above embodiment has preferably a haze value measured according to ASTM D 1003 of less than 10, preferably 5 and most preferably 3.

According to still another aspect, the present invention relates to a condensed phase composition, which is obtainable with a method as described above.

The condensed phase composition preferably comprises:
i) at least 95% by weight of cyclic ester,
ii) at least 0.5 ppm of at least one catalyst capable of catalyzing a polymerization of the cyclic ester and/or at least 0.01 mmol per kg of at least one initiator capable of initiating a polymerization of the cyclic ester and
iii) 0.001 to 0.5% by weight of polymerization inhibitor.

In accordance with another aspect, the present invention relates to the use of the aforementioned condensed phase composition for the production of a polyester, wherein before the start of the polymerization catalyst and/or polymerization initiator are added to the condensed phase composition, so that the total amount of polymerization catalyst is 1 ppm to 1% by weight and/or the total amount of polymerization initiator is 0.1 to 50 mmol/kg based on the total amount of condensed phase composition. Optionally, the condensed phase composition is purified before the addition of catalyst and/or polymerization initiator.

In accordance with another aspect, the present invention relates to the use of the aforementioned condensed phase composition for the production of a polyester, wherein the condensed phase composition is mixed with a melt comprising a cyclic ester and/or a polyester, with the optional addition of a polymerization catalyst and or polymerization initiator, so that the total amount of polymerization initiator is 0.1 to 50 mmol/kg by weight based on the total amount of final composition, wherein the so obtained mixture is then further polymerized. Optionally, the condensed phase composition is purified before mixing with the melt.

This embodiment is in particular suitable for the production of polylactic acid.

Specific embodiments in accordance with the present invention are now described with reference to the appended drawings.

Figure 1:
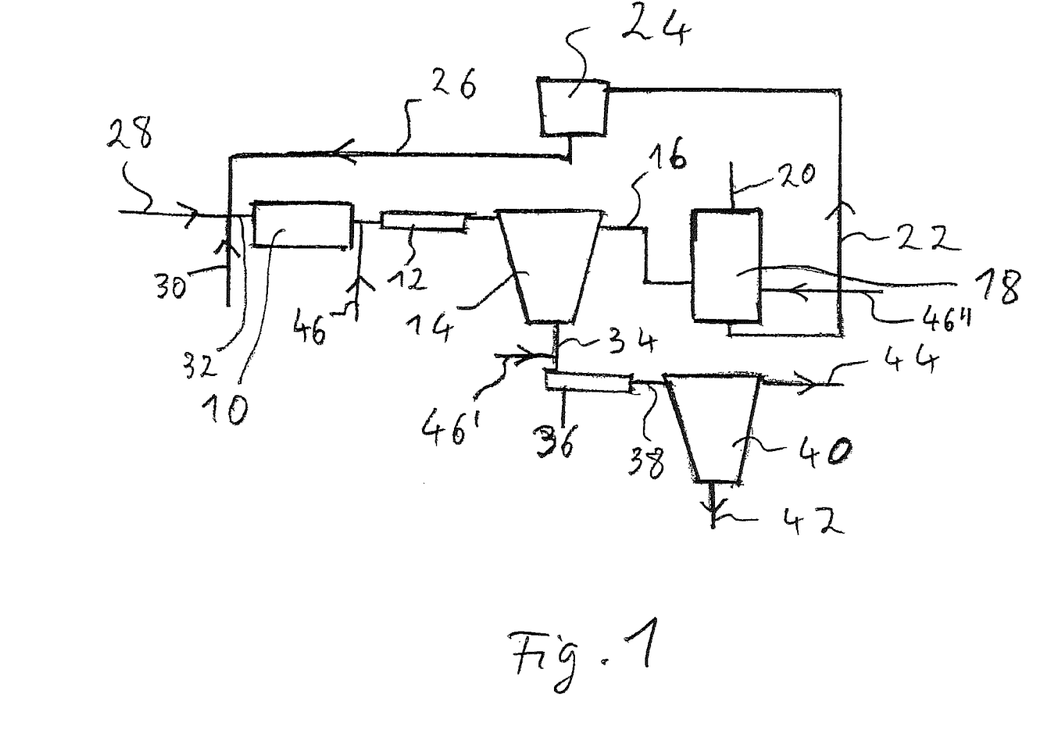
FIG. 1 is a schematic drawing of a plant for manufacturing a polyester from cyclic ester monomer in accordance with a first embodiment of the present invention.

FIG. 1 shows a plant for manufacturing a polyester from cyclic ester monomer in accordance with a first embodiment of the present invention.

The plant comprises a reactor system 10 for polymerizing cyclic ester in the presence of a catalyst and optionally an initiator to form a reaction mixture comprising polyester and unreacted cyclic ester, downstream thereof a unit 12 and downstream thereof a first devolatilization chamber 14. Unit 12 is a static mixer, a heat exchange or a combination thereof.

From the upper part of the first devolatilization chamber 14 a vapor line 16 leads to a condenser 18, which comprises a gas removal line 20 and a fluid removal line 22. The fluid removal line 22 leads to a static melt crystallizer 24, which is connected by means of a recycle line 26 with the feed of the reactor system 10. Into the recycle line 26, a cyclic ester supply line 28 as well as with a supply line 30 for polymerization catalyst and polymerization initiator leads. Lines 26, 28 and 30 combine to the feed line 32 leading into the reactor system 10.

From the lower part of the first devolatilization chamber 14 a liquid line 34 leads to a unit 36 and from there via line 38 to a second devolatilization chamber 40, wherein unit 36 is a static mixer, a heat exchanger or a combination thereof. The second devolatilization chamber 40 comprises a polymer withdrawal line 42 and a vapor removal line 44.

Three supply lines for polymerization inhibitor 46, 46', 46''' are provided, namely a first one 46 leading into the line leading to the unit 12, a second one 46' leading into the line 34 leading to the unit 36 and a third one 46" leading into the condenser 18.

Subsequently, the continuous operation of this plant is described by means of using lactide as cyclic ester starting material for preparing polylactic acid.

Fresh lactide is supplied via supply line 28 and fresh polymerization catalyst, namely tin octoate, and fresh polymerization initiator, namely 2-ethylhexanol, are supplied via supply line 30 into the recycle line 26. The mixture of these streams is fed via the supply line 32, which optionally includes a static mixer, into the reactor system 10, which comprises one or more polymerization reactors and preferably one to three loop reactors and optionally at least one plug flow reactor. The mixture polymerizes in the reactor system 10 forming a reaction mixture or raw composition, respectively, which contains polylactic acid having a Mw of at least 20,000 g/mol, unreacted lactide, polymerization catalyst and polymerization initiator. Via the supply line 46, at least a polymerization inhibitor, for example poly(oxy-1,2-ethanediyl), alpha-isotridecyl-omega-hydroxy-phosphate and poly(oxy-1,2-ethanediyl), alpha-hydro-omega-hydroxy-mono-$C_{12-15}$-alkyl ether phosphate, is added into this stream and the combined stream is led into the unit 12, where it is homogeneously mixed.

The so obtained mixture is then conveyed into the first devolatilization chamber 14, which is operated in this case at a temperature of 190° C. and at a pressure of 15 mbar. Under these conditions, in the devolatilization chamber 14 a vapor stream including mainly unreacted lactide and the catalyst and/or the initiator and/or a reaction product or a residue of the at least one catalyst and/or the at least one initiator as well as a liquid stream including mainly the polylactic acid product, a part of the catalyst, a part of the initiator and all or at least essentially all of the polymerization inhibitor fed into the stream via line 46 phase separate. The reason that all or at least essentially all of the polymerization inhibitor is included in the liquid stream removed from the first devolatilization chamber 14 via line 34 is that the polymerization inhibitor, poly(oxy-1,2-ethanediyl), alpha-isotridecyl-omega-hydroxy-phosphate or poly(oxy-1,2-ethanediyl), alpha-hydro-omega-hydroxy-mono-$C_{12-15}$-alkyl ether phosphate, has at these devolatilization conditions, namely at a temperature of 190° C. and at a pressure of 15 mbar, a so low volatility that it is not transferred in the devolatilization chamber into the vapor stream. It has to be noted that the polymerization inhibitor is added in this case via line 46 not for the purpose of stabilizing the condensed phase composition into the stream drawn off from the reactor system 10, but for the sole purpose of stabilizing the polylactic acid product, i.e. in order to avoid a further polymerization of the polylactic acid.

Via line 46' further polymerization inhibitor is added into the crude product stream and the so obtained mixture is conveyed into the unit 36, where it is homogeneously mixed. Thereafter, the raw product is subjected to a second devolatilization in the second devolatilization chamber 40, where residual low boiling impurities, namely mainly lactide, are removed from the purified polylactic acid product stream. While the purified polylactic acid product stream is removed from the plant via the polymer line 42, the residual impurities are removed from the plant via the vapor removal line 44. Alternatively, the residual impurities including lactide may be fed into the vapor line 16 or condensed and fed into the fluid removal line 22.

The vapor obtained in the first devolatilization chamber 14 is drawn off from the first devolatilization chamber 14 via the vapor line 16 and is fed into the condenser 18. In the condenser, a condensed phase enriched with lactide is obtained. Moreover, poly(oxy-1,2-ethanediyl), alpha-isotridecyl-omega-hydroxy-phosphate or poly(oxy-1,2-ethanediyl), alpha-hydro-omega-hydroxy-mono-$C_{12-15}$-alkyl ether phosphate is supplied as polymerization inhibitor via line 46" in the condenser 18 into the condensed phase composition obtained therein and mixed to obtain a homogeneous mixture. The condensed phase composition is withdrawn from the condenser 18 as a homogeneous mixture and conveyed via the recycle line 26 into the static melt crystallizer 24, where the lactide is separated from impurities, namely from remaining polymerization catalyst, remaining polymerization initiator and polymerization inhibitor. The so obtained purified lactide is recycled into the reactor system 10 via lines 26.

Due to the addition of the polymerization inhibitor via line 46" in the condenser 18 into the condensed phase composition, this composition is stabilized against oligomerization and/or polymerization initiated by the catalyst and/or initiator included therein, so that the stabilized condensed phase composition can be incubated for a long period of time, i.e. in particular for several days, such as for at least 10 days, at elevated temperatures of for example 120° C., i.e. in the molten condition, without any oligomerization and/or polymerization of the lactide, which would not only lead to an unwanted consumption of the lactide, but in particular also to an unwanted viscosity increase of the condensed phase composition, which would make it difficult, if not impossible, to convey the condensed phase composition into the crystallizer.

Figure 2:
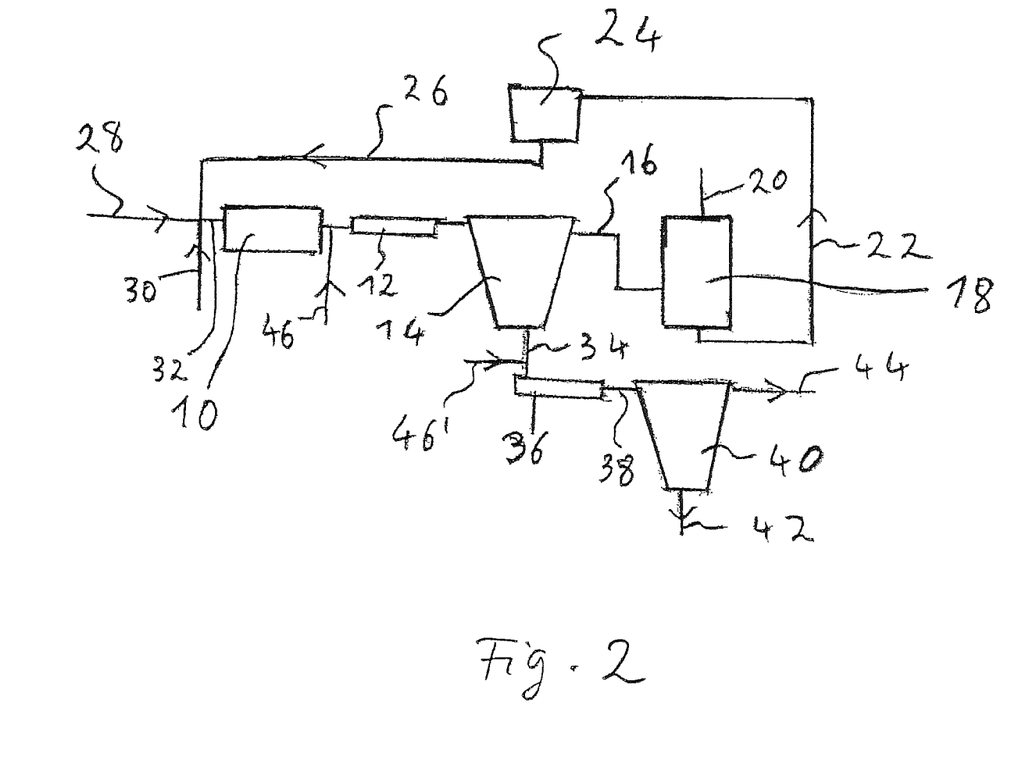
FIG. 2 is a schematic drawing of a plant for manufacturing a polyester from cyclic ester monomer in accordance with a second embodiment of the present invention.

The plant for stabilizing a condensed phase composition in a process of manufacturing a polyester from cyclic ester monomer in accordance with a second embodiment of the present invention, as shown in FIG. 2, is identical to that of the plant shown in FIG. 1 except that the supply line for polymerization inhibitor 46" into the condenser 18 is missing. In this embodiment more of poly(oxy-1,2-ethanediyl), alpha-isotridecyl-omega-hydroxy-phosphate or poly(oxy-1,2-ethanediyl), alpha-hydro-omega-hydroxy-mono-$C_{12-15}$-alkyl ether phosphate as polymerization inhibitor is supplied via line 46 into the raw composition drawn off from the reaction system 10 and the devolatilization is performed in the first devolatilization chamber at a higher temperature and under more reduced pressure, namely at a temperature of 215° C. at a pressure of 3 mbar. On account of this reason, a sufficient amount of polymerization inhibitor is transferred in the vapor phase drawn off from the first devolatilization chamber 14 via line 16 so that in the condenser 18 a condensed phase composition is obtained, which is stabilized as well as that obtained with the plant shown in FIG. 1.

Figure 3:
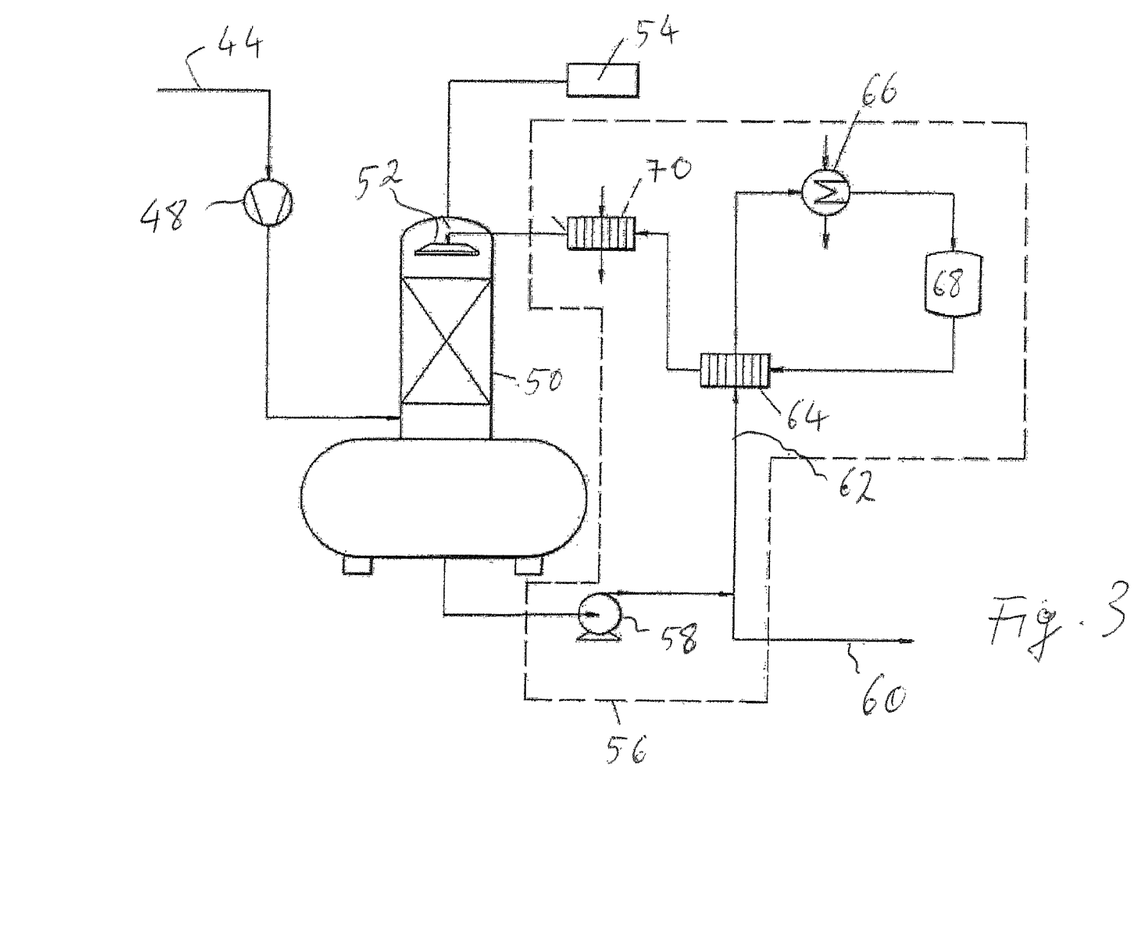
FIG. 3 is a schematic drawing of a wash section located downstream of a plant shown in FIG. 1 or FIG. 2.

FIG. 3 shows a wash section with a recirculation system or circulate, respectively, for removing lactide from the vapor drawn off from the second devolatilization chamber 40 as stream 44 shown in FIGS. 1 and 2. The vapor stream 44 is passed through a steam ejector 48 and then fed into a countercurrent column 50, in which it is contacted with aqueous solution, which is distributed at the head of the countercurrent column 50 by means of a distributor 52. The column 50 is kept under vacuum by means of the vacuum system 54. Lactide from the vapor stream 44 dissolves and at least partially hydrolyzes in the aqueous solution and is then withdrawn from the column 50 and introduced into the recirculation system 56, where it pumped by means of pump 58. A partial stream of this mixture is removed from the plant via the removal line 60 and disposed. The remaining partial stream of the mixture is pumped through a first heat exchanger 64 and a second heat exchanger 66, where it is heated to a suitable temperature for complete or at least nearly complete dissolution and hydrolysis of the lactide, before it is transported into the reactor 68, where it is incubated for a sufficient time to effect a complete or at least nearly complete dissolution and hydrolysis of the lactide. Afterwards, the mixture is pumped through the first heat exchanger 64 and through a third heat exchanger 70, before it is led to the distributor 52.

Alternatively to the embodiment shown in FIG. 3, the washing section may be connected with the vapor 16 drawn off from the first devolatilization chamber 14. It may even replace in this embodiment the condenser, or it may be connected with the gas removal line 20 in addition to the condenser 18.

Likewise it will be understood that the washing section for removing lactide from the vapor drawn off from the second devolatilization chamber 40 may also optionally be used together with a condenser.

Accordingly the polymerization inhibitor and/or its decomposition and/or hydrolysis products may often as well be detected in the recirculation system 56 for these embodiments having a washing section.

Subsequently, the present invention is described by means of non-limiting examples.

EXAMPLE 1

A plant as shown in FIG. 1 was operated with lactide as cyclic ester. Poly(oxy-1,2-ethanediyl), alpha-hydroxy-omega-hydroxy-mono-$C_{12-15}$-alkyl ether phosphate (CAS-No: 68071-35-2) was used as polymerization inhibitor and was added to the polymerization stream at the outlet of the loop and plug flow reactor 10 at position 46. Three runs were operated during several days of continuous operation, wherein the inhibitor concentrations were 0.04% by weight, 0.05% by weight and 0.1% by weight, respectively, relative to the lactide fed to the polymerization reactor. A wash system as shown in FIG. 3 was in fluid connection with vapor stream 44 drawn off from the outlet of the second devolatilizer 40. The polymerization plant was kept in operation for several days in a raw and the occurring of fouling was monitored continuously during the plant operation.

No evidence of solid depositions could be observed neither in the countercurrent column 50 nor in the recirculation system 56.

For each of the three runs, during the operation of the plant the polylactic acid product at the removal line 42 of the polymerization plant was pelletized using a conventional underwater pelletizer and samples in pellets in the mm size range were collected for characterization. The obtained results are summarized in Tables 1 and 2.

TABLE 1

Characterization results of Polylactide (PLA) pellets.

| Run | Residual monomer [%] | ΔRM @220° C./60 min | ΔRM @250° C./25 min |
|---|---|---|---|
| 1 | 0.11 | 0.11 | 0.13 |
| 2 | 0.12 | 0.05 | 0.15 |
| 3 | 0.11 | 0.04 | 0.07 |

TABLE 2

Characterization results of PLA pellets.

| Run | Haze, H | YI-D1925(a) | YI-D1925(b) |
|---|---|---|---|
| 1 | 1.5 ± 0.3 | <5 | <3 |
| 2 | 1.1 ± 0.1 | 5.1 | <3 |
| 3 | 1.1 ± 0.1 | 5.1 | <3 |

(a) As collected pellets obtained after underwater granulation
(b) The same pellets after crystallization The results summarized in Table 1 show that a low residual monomer PLA with a high stability against lactide reformation is obtained according to the present invention. Residual monomer was constantly lower than 0.3% by weight and even lower than 0.2%. The lactide reformation was constantly below 0.3%.

Moreover, the results summarized in Table 2 show that all samples had extremely good visual appearance. While an acceptable value of the yellowness index is YI<30 as, and is preferably less than YI<20, in the examples an even lower Yellowness index was recorded, namely one which was constantly lower than 10 and even lower than 3 upon crystallization of the pellets. Similarly, for the haze, H was below H<10 and constantly below H<3.

The lactide residual monomer content was measured by gas chromatography (GC). A sample was dissolved in a dichloromethane together with 1-octanol as internal standard. The polymer was precipitated from the solution by mixing 1 ml of solution with 10 ml of an antisolvent solution, namely a mixture of acetone/hexane (5/95 vol/vol). The final solution was shaked for 1 to 2 hours to ensure the complete precipitation of the polymer and the supernatant from the so obtained final solution is then filtered and injected into the GC.

The yellowness index was measured using a Chromameter as follows: A petri dish was filled with 15 g of PLA pellets and the yellowness index, YI was measured according to the ASTM D1925 method, with illuminant C and observer 2°.

The lactide reformation was measured as follows: First, the residual lactide monomer content in the sample was measured by gas-chromatography and quantified as weight percentage of lactide in the sample, RM1. Then, the sample pellets were dried for at least 4 hours under inert atmosphere at 70° C., loaded on into an melt flow index instrument and heated into the MFI capillary at the desired temperature for a time equal to the test time. After the test time was passed, the material was withdrawn from the MFI outlet as a thin strand, whose content in lactide was measured again by GC, RM2. The extent of lactide reformation was then measured as ΔRM=RM2-RM1 which measured the amount of lactide reformed during the test.

The transmission haze was measured on Haze-Gard Plus® apparatus (BYK Gardner GmbH, Germany) according to ASTM D 1003 (ISO/DIS 14782). Transmission Haze is defined as:

$$H=100*T_{dif}/T_T$$

where $T_{dif}$ is the diffuse transmittance and $T_T$ is the total transmittance. Haze was measured in 10 different positions of the samples to verify the uniformity of the specimen. The specimens were prepared as follows: PLA pellets were dried at 80° C. for 4 hours under nitrogen flow. The pellets were then molded to plates of 3×2×0.5 cm using a press heated at 200° C., which was rapidly cooled with a water-cooled press after melting of the pellets. Specimens free of defects (e.g. bubbles) were then further pressed into 1 mm thick films using the same press system, and then used for the measurement.

Figure 4:
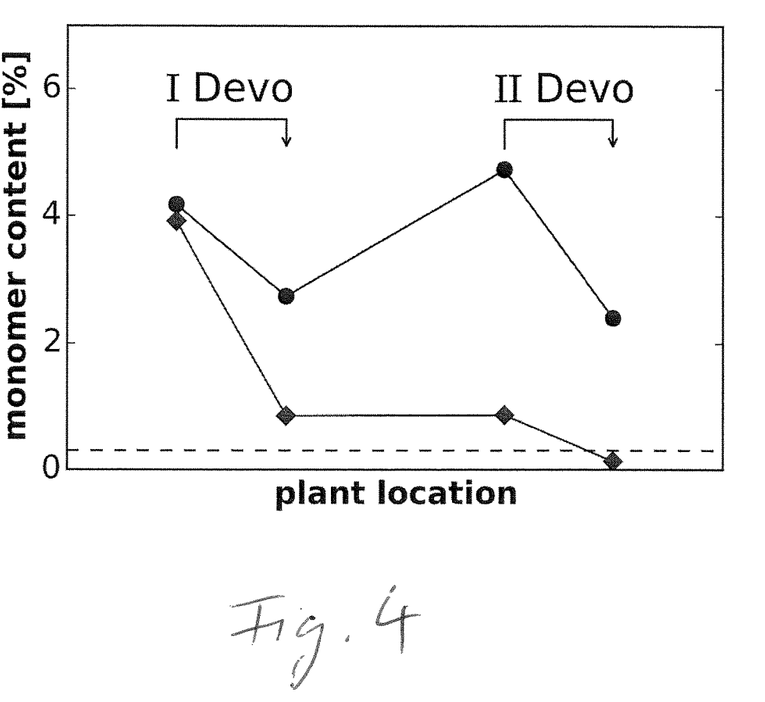
FIG. 4 shows the evolution of monomer content in example 3 through the two-stages devolatilization section in the absence (circles) and in the presence (diamonds) of an alkoxylated alcohol based acid phosphate.

FIG. 4 shows the evolution of monomer content through the two-stages devolatilization section in the absence and in the presence of poly(oxy-1,2-ethanediyl), alpha-hydroxy-omega-hydroxy-mono-$C_{12-15}$-alkyl ether phosphate (CAS-No: 68071-35-2). The dashed line represents the maximum tolerated value to produce an industrially relevant material. Continuous lines are provided as a guide to the eye. This figure demonstrates the additional benefit of the use of an alkoxylated alcohol based acid phosphate as a polymerization inhibitor in terms of minimizing the undesirable loss of monomer to the overhead devolatilization system. Without wishing to be limited by a specific mechanism, the inventors believe that this shows that such polymerization inhibitors are effective in minimizing undesired back-biting and other chain depolymerization reactions which would liberate monomer resulting in its undesired loss through subsequent devolatilization. Thus in preferred embodiments of the invention, the addition of an alkoxylated alcohol based acid phosphate as polymerization inhibitor will substantially decrease the amount of monomer devolatilized to the overhead system versus the case when no polymerization inhibitor is added. One skilled in the art will understand that this difference may be measured and expressed as a flow rate to the overhead system (e.g. kg/h, measured by accumulating the devolatilized mass over a defined period of time) or as a relative percentage to the feedrate of the feedstream entering the devolatilization system. In some specific preferred embodiments the monomer content going to a first devolatilization unit will be reduced by at least 0.5% and to a second devolatilization unit by at least 1, preferably 2%, all relative to the feedstream. It was also observed (not shown) that the use of the alkoxylated alcohol based acid phosphate polymerization inhibitors, specifically poly(oxy-1,2-ethanediyl), alpha-hydroxy-omega-hydroxy-mono-$C_{12-15}$-alkyl ether phosphate (CAS-No: 68071-35-2), also significantly reduced the yellowness index of polymer samples taken after either of the two devolatilization units versus comparative examples in which no polymerization inhibitor was added. Therefore in preferred embodiments of the invention, the addition of an alkoxylated alcohol based acid phosphate as polymerization inhibitor will substantially decrease the yellowness index of the polymer mass exiting the devolatilization unit(s) versus the case when no polymerization inhibitor is added. In certain specific preferred embodiments of the invention, it has been found that the use of these polymerization inhibitors reduces the yellowness index of the final polymer pellets by at least 5, preferably 10, as measured in accordance with YI-D1925.

COMPARATIVE EXAMPLE 1-1

The same method as in example 1 was repeated except that a mixture of mono and di-stearic acid phosphates was added to the polymerization stream at position 46 so that the inhibitor concentration was and 0.1% by weight.

Extensive fouling was observed in the wash system. More specifically, fouling was in the form of waxy residues floating on the liquid solution in the countercurrent column 50, which in turn caused difficult operation of the recirculation system 56.

This example clearly demonstrates that not all phosphorous based compounds can be used in a polymerization plant for the production of polylactic acid.

COMPARATIVE EXAMPLE 1-2

The same method as in comparative example 1-1 was repeated except that dibutyl phosphate was added to the polymerization stream at position 46. Two runs were operated, namely a first with an inhibitor concentration of 0.1% by weight and a second with an inhibitor concentration of 0.04% by weight relative to the lactide feed.

In both runs, already after a few hours of inhibitor dosing it could be observed through the glass window present in the devolatilization vessel 14 that layers of material started depositing at the walls of the devolatilizer as well as on the glass window. Due to the high temperature of the devolatilizer, such layer of material turned into black carbonized layers.

A similar phenomenon was observed in an independent run in which dibutyl phosphate was added to the polymerization stream in position 46', which caused the deposition of material on the glass window and at the walls of the devolatilizer 40.

Also this comparative example clearly shows that not all phosphorous based compounds can be used in a polymerization plant for the production of polylactic acid.

EXAMPLE 2 AND COMPARATIVE EXAMPLE 2

Solutions were prepared by mixing 5 ml of lactic acid and 5 ml of water in a vial together with a weighted amount of inhibitor as reported in Table 3.

All vials were cap-sealed immediately after preparing the solutions. The physical state of each additive, in its pure state at room temperature, is reported in the third column of Table 3.

Then the solutions where shaken for ½ hours and left to rest for a few hours. The physical status of the solutions was then observed. All but the solution containing ADK-AX-71 were composed of free flowing liquid, e.g. they were apparently free of any solid residue or insoluble solid-like fraction.

To check if the presence of suspended material in the solution containing ADK-AX-71 was due to a slow solubilization or to an actual insolubility issue, all solutions were additionally heated in an oven at 130° C. for 2 hours to ensure a complete melting of the inhibitors and then allowed to cool down to room temperature.

The presence or absence of unsoluble fractions is reported in Table 3.

TABLE 3

Solubility test of inhibitor

| Inhibitor | Amount [g] | Physical state of the inhibitor at room temperature | Presence of unsoluble fraction in the solution | Presence of unsoluble fraction in the solution (after heating/cooling) |
|---|---|---|---|---|
| ADK STAB AX-71 (mono- and distearyl acid phosphate) | 0.30 | Solid | Yes | Yes |
| Poly(oxy-1,2-ethanediyl), alpha.-hydro-.omega.-hydroxy-, mono-$C_{12-15}$-alkyl ether phosphates | 0.35 | Viscous liquid | No | No |
| Dibuthyl-phosphate (aliphatic phosphate) | 0.43 | Liquid | No | No |
| N,N'-bis(salicylidene)-1,3-propanediamine | 0.30 | Solid | No | No |

EXAMPLE 3

A 20 ml vial was filled with 5 g of lactide and 0.19% by weight of N,N'-bis(salicylidene)-1,3-propanediamine. The vial was put into the oven at 80° C. for 5 hours do dry the lactide. After drying, the vial was sealed and heated to 160° C. to melt the lactide. Then, a 0.1 ml of a 1% (wt/wt) solution of TinOctoate/Ethyl-Hexanol was injected into the vial, which was shaken to homogenize the mixture and allowed to react overnight.

The same procedure was applied to a second vial without adding any inhibitor.

After the reaction, both vials were cooled down and their content analyzed by Gas-Chromatography. The so described procedure was repeated two times with the inhibitor and two times without the inhibitor, to ensure reproducibility. Results below are average of the two repetitions.

An average lactide conversion of 72% was measured for the sampled polymerized in the absence of N,N'-bis(salicylidene)-1,3-propanediamine, while a negligible average conversion of much less than 5% was measured in the presence of N,N'-bis(salicylidene)-1,3-propanediamine.

These results show that N,N'-bis(salicylidene)-1,3-propanediamine is a very effective catalyst inhibitor, which, as shown in the example above, is not expected to cause any fouling problems in a washing system as depicted in FIG. 3.

REFERENCE NUMERALS

10 reactor system
12 unit (mixer(s) and/or heat exchangers)
14 first devolatilization chamber
16 vapor line
18 condenser
20 gas removal line
22 fluid removal line
24 static melt crystallizer
26 recycle line
28 cyclic ester (lactide) supply line
30 supply line for catalyst and initiator
32 supply line
34 liquid (melt) line
36 unit (mixer(s) and/or heat exchangers)
38 line
40 second devolatilization chamber
42 polymer withdrawal line
44 vapor removal line
46, 46', 46'' supply line for polymerization inhibitor(s)
48 ejector
50 countercurrent column
52 distributor for aqueous solution
54 vacuum system
56 recirculation system
58 pump
60 removal line
62 line
64 first heat exchanger
66 second heat exchanger
68 reactor
70 third heat exchanger

The invention claimed is:

1. A process of manufacturing a polyester from cyclic ester monomer, wherein the method comprises the steps of:
   a) providing a cyclic ester,
   b) polymerizing the cyclic ester in the presence of a catalyst in a reactor to form a reaction mixture comprising polyester and unreacted cyclic ester,
   wherein after the polymerization at least one polymerization inhibitor is added to the reaction mixture, wherein the polymerization inhibitor is selected from the group consisting of monoimines, diimines, mono alkyl phosphates according to the formula $RPO_4H_2$, wherein R is a $C_{6-16}$ linear, branched or cyclic alkyl group, di alkyl phosphates according to the formula $R_2PO_4H$, wherein each R is independently a $C_{6-16}$ linear, branched or cyclic alkyl group or a combination thereof, and phosphate esters according to the general formula (I)

wherein at least one of R', R'' and R''' has the general structure as in general formula (II)

wherein n>0 and Q is independently a $C_{1-16}$ linear, branched or substituted alkyl group, and R is independently an H or linear, branched, cyclic or substituted alkyl group or a phenyl group derivative, and wherein any of R', R'' and R''' not having the general structure as in general formula (II) is independently an H or a linear, branched, cyclic or substituted alkyl group or a phenyl group derivative.

2. The process in accordance with claim 1, wherein as polymerization inhibitor a phosphate ester according to the general formula (I) is used, in which either i) R' is an H and R" and R'" are according to the general formula (II) or ii) R' and R" are an H and R'" is according to the general formula (II).

3. The process in accordance with claim 1, wherein as polymerization inhibitor a phosphate ester according to the general formula (I) is used, in which n of the at least one of R', R" and R'" having the general structure as in general formula (II) is 2 to 20, and in which Q of the at least one of R', R" and R'" having the general structure as in general formula (II) is a $C_{1-15}$ linear, branched or substituted alkyl group.

4. The process in accordance with claim 1, wherein as polymerization inhibitor a poly(oxy-1,2-ethanediyl), alpha-isotridecyl-omega-hydroxy-phosphate, a poly(oxy-1,2-ethanediyl), alpha-hydro-omega-hydroxy-mono-$C_{12-15}$-alkyl ether phosphate, or combination thereof is used.

5. The process in accordance with claim 1, wherein as polymerization inhibitor a diimine is used.

6. The process in accordance with claim 5, wherein as polymerization inhibitor N,N'-bis(salicylidene)-1,3-propanediamine is used.

7. The process in accordance with claim 1, which further comprises the following steps:
c) subjecting the reaction mixture to a devolatilization to obtain a purified polyester as molten residue and vapor, wherein the vapor includes mainly i) cyclic ester and ii) catalyst and/or initiator and/or a reaction product or a residue of catalyst and/or of initiator, and
d) subjecting the vapor stream to a condensation to obtain a condensed phase composition,
wherein at least a part of the polymerization inhibitor is added to the vapor stream drawn off from the devolatilization and/or to the condensed composition, and/or wherein at least a part of the polymerization inhibitor is added to the reaction mixture before step c).

8. The process in accordance with claim 1, wherein an amount of the cyclic ester devolatilized to an overhead system comprising a gas removal line (20) and/or vapor removal lines (16, 44) is decreased relative to the amount of the cyclic ester devolatilized when no polymerization inhibitor is added to the reaction mixture.

9. The process in accordance with claim 1, wherein the polyester has a yellowness index measured after pelletization in accordance with YI-D1925 that is reduced relative to a yellowness index after pelletization of a polyester in which no polymerization inhibitor has been added to the reaction mixture.

10. The process in accordance with claim 1, wherein the at least one cyclic ester is selected from the group consisting of lactide, L-lactide, D-lactide, meso-lactide, ε-caprolactone, glycolide, and mixtures thereof.

11. A polyester produced in accordance with the process of claim 1.

12. A condensed phase composition produced in accordance with the process of claim 7, the condensed phase composition comprising:
i) at least 95% by weight of cyclic ester,
ii) at least 0.5 ppm of at least one catalyst capable of catalyzing a polymerization of the cyclic ester and/or
at least 0.01 mmol per kg of at least one initiator capable of initiating a polymerization of the cyclic ester and
iii) 0.001 to 0.5% by weight of polymerization inhibitor.

13. A method for the production of a polyester, comprising the steps of obtaining and performing a polymerization of the condensed phase composition of claim 12, wherein before the start of the polymerization catalyst and/or polymerization initiator are added to the condensed phase composition, so that the total amount of polymerization catalyst is 1 ppm to 1% by weight and/or the total amount of polymerization initiator is 0.1 to 50 mmol/kg based on the total amount of condensed phase composition.

14. A method for the production of a polyester, comprising the steps of obtaining the condensed phase composition of claim 12, wherein the condensed phase composition is mixed with a melt comprising a cyclic ester and/or a polyester, with the optional addition of a polymerization catalyst and or polymerization initiator, so that the total amount of polymerization initiator is 0.1 to 50 mmol/kg by weight based on the total amount of final composition, wherein the so obtained mixture is then further polymerized.

15. The method of claim 14, wherein the condensed phase composition is purified before mixing with the melt.

16. The method of claim 13, wherein the condensed phase composition is purified before the addition of catalyst, before the addition of polymerization initiator, or both.

17. The process of claim 1, wherein (b) the cyclic ester is further polymerized in the presence of an initiator in the reactor to form the reaction mixture.

18. The process of claim 3, wherein as polymerization inhibitor a phosphate ester according to the general formula (I) is used, in which n of the at least one of R', R" and R'" having the general structure as in general formula (II) is 2 to 11.

19. The process of claim 1, wherein Q of the at least one of R', R" and R'" is a 1,2-ethanediyl group.

* * * * *

UNITED STATES PATENT AND TRADEMARK OFFICE
CERTIFICATE OF CORRECTION

PATENT NO. : 10,066,054 B2
APPLICATION NO. : 15/510859
DATED : September 4, 2018
INVENTOR(S) : Costa et al.

It is certified that error appears in the above-identified patent and that said Letters Patent is hereby corrected as shown below:

In the Claims

Column 24, Lines 63-67, Claim 1 should read: -- wherein n>0 and Q is independently a $C_{1-16}$ linear, branched or substituted alkyl group, and R is independently an H or linear, branched, cyclic or substituted alkyl group or a phenyl group derivative, and wherein any of R', R'' and R''' not having the general structure as --

Column 25, Lines 13-17, Claim 3 should read: -- R', R'' and R''' having the general structure as in general formula (II) is 2 to 20, and in which Q of the at least one of R', R'' and R''' having the general structure as in general formula (II) is a $C_{1-15}$ linear, branched or substituted alkyl group. --

Signed and Sealed this
Sixteenth Day of October, 2018

Andrei Iancu
*Director of the United States Patent and Trademark Office*